(12) United States Patent
Weber et al.

(10) Patent No.: US 11,703,891 B2
(45) Date of Patent: Jul. 18, 2023

(54) CONTROL OF A FILLING PROCESS

(71) Applicant: Sick AG, Waldkirch (DE)

(72) Inventors: Thomas Weber, Waldkirch (DE);
William Weigold, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/542,972

(22) Filed: Dec. 6, 2021

(65) Prior Publication Data

US 2022/0179435 A1   Jun. 9, 2022

(30) Foreign Application Priority Data

Dec. 7, 2020 (EP) .................................... 20212196

(51) Int. Cl.
| | |
|---|---|
| *G05D 7/06* | (2006.01) |
| *G05D 9/12* | (2006.01) |
| *B67D 7/36* | (2010.01) |
| *G05B 19/416* | (2006.01) |

(52) U.S. Cl.
CPC .............. *G05D 9/12* (2013.01); *B67D 7/362* (2013.01); *G05B 19/416* (2013.01); *G05D 7/0617* (2013.01); *G05B 2219/37371* (2013.01)

(58) Field of Classification Search
None
See application file for complete search history.

(56) References Cited

FOREIGN PATENT DOCUMENTS

| | | |
|---|---|---|
| DE | 19904166 A1 | 8/2000 |
| DE | 10149473 A1 | 4/2003 |
| DE | 102008016296 A1 | 10/2009 |
| DE | 102013100702 A1 | 7/2014 |
| DE | 102014107364 A1 | 11/2015 |
| DE | 102005035264 B4 | 4/2018 |
| DE | 102017124565 A1 | 4/2019 |
| EP | 2460761 A1 | 6/2012 |
| WO | 0002055 A1 | 1/2000 |
| WO | 2007048742 A1 | 5/2007 |

OTHER PUBLICATIONS

Machine Translation of DE 10149473 A1 (Year: 2003).*
European Search Report dated May 28, 2021 for application No. EP 20212196.8.

* cited by examiner

*Primary Examiner* — Ryan A Jarrett
(74) *Attorney, Agent, or Firm* — Nath, Goldberg & Meyer; Jerald L. Meyer; Morgan D. Rosenberg

(57) ABSTRACT

A method for controlling a filling process, wherein a predetermined filling quantity of a medium is filled into a container, the flow rate of the medium flowing into the container is measured as a time series of measured values for the instantaneous flow rate and a filling quantity already filled is estimated from the time series, wherein at least one current measured value of the time series is corrected on the basis of at least one earlier measured value of an earlier time series of measured values of the flow rate of an earlier filling process.

17 Claims, 2 Drawing Sheets

CONTROL OF A FILLING PROCESS

Figure 1:
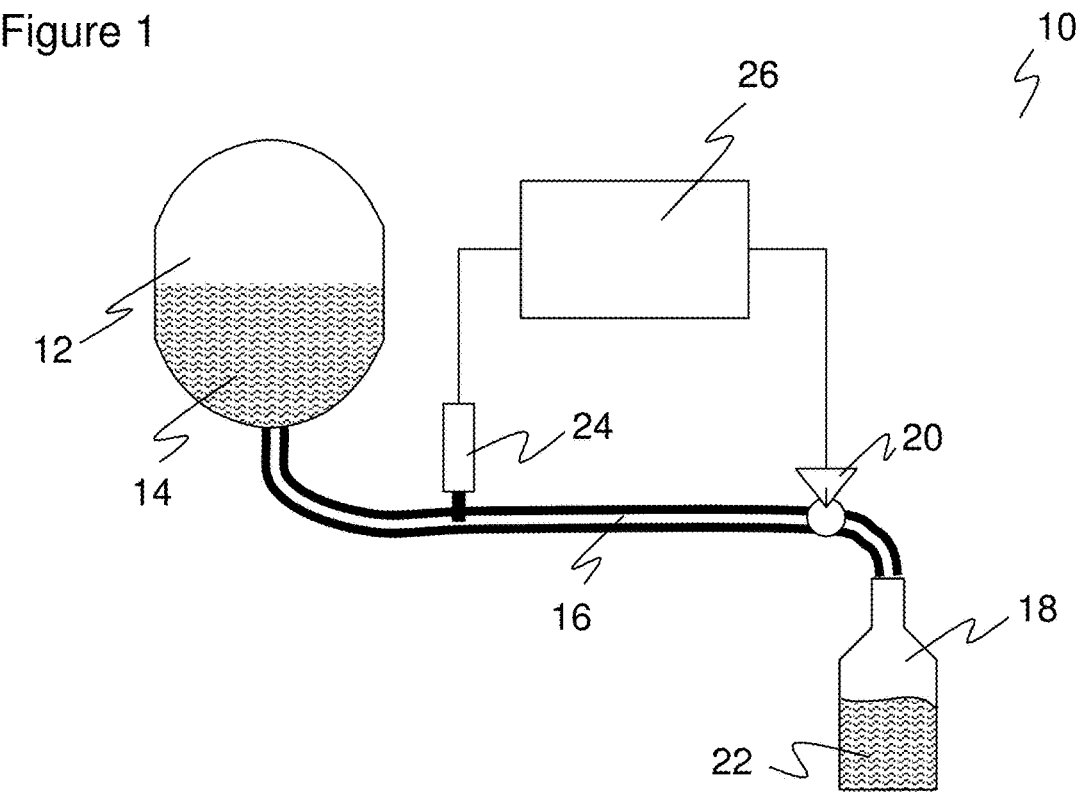

The invention relates to a method for controlling a filling process and to a filling device for filling a container with a medium.

Filling machines are used in various fields such as food, pharmaceuticals, cosmetics or chemicals. The medium to be filled is usually a liquid, such as a beverage, or also a liquid that is not food, such as mineral oil or the like. The challenge is to maintain the minimum filling quantity and at the same time to exceed it as little as possible. In addition, a high and reliable throughput is desired.

There are numerous approaches in the prior art to determine the filled quantity with a sensor. A scale can be used to directly determine the filled mass, but weighing is not well suited for fast processes, as the movement of the filling machine causes vibrations that limit the accuracy of the filling. A height gauge or level measurement is used to determine the filling height. However, variances in the containers result in an error in the filling quantity.

Therefore, the flow is alternatively measured in a supply line to the container. There are numerous measuring principles for this, such as Coriolis sensors, magnetic-inductive flow sensors for media having some minimal conductivity, ultrasonic flow sensors or vortex sensors. Furthermore, a simple sensorless timing of the filling valve is conceivable. However, this does not take into account the variance in flow behavior. In addition, this does not allow compensation for the aging of the valves and the influences on the closing behavior and the closing speed.

For an accurate filling process, the valve is therefore not simply controlled by time, but by means of a flow measurement. However, measurement errors in determining the flow rate then result in a correspondingly inaccurately determined filled quantity. For example, in DE 10 2014 107 364 A1, a time for closing a valve used for filling is corrected during the filling process on the basis of a detected change in the flow rate. However, this correction remains incomplete, since measurement errors and noise of the flow rate remain uncompensated and therefore fully affect the time.

DE 199 04 166 A1 disregards its current flow measurement if the electrical conductance changes strongly due to a high number of particles in the medium, and instead falls back on previous dosing processes. However, this means that measurement information is missing for the current filling process, at a time where the medium qua prerequisite has changed quite a lot, and therefore inaccuracies occur.

A control module for a filling system is known from DE 10 2013 100 702 A1. The course of the flow through a respective filling point during a filling cycle is measured in real time. Anomalies are detected by comparison with a predefined target course. However, the measured deviations are not used for an improved detection of the filled quantity, but the comparison is used for diagnosis in order to be able to react by adjusting filling parameters or aborting the filling process. The target course would also not help to determine the actual filling quantity more precisely, this would only be possible on the basis of the actual measurement, whose measurement errors, however, are not improved in any way.

In DE 10 2017 124 565 A1, a filling time is adjusted from a total flow rate of a plurality of fillings. This averages out measurement errors in the flow rate determination of individual fillings, but at the same time also the actual variance of the individual filling.

DE 10 2005 035 264 B4 determines the flow rate with a neural network and, if necessary, adjusts control data for the control or regulation of a filling. A neural network also can only evaluate the measurement data it receives, so that measurement errors for the flow rate still lead to inaccuracies in the filled quantity.

It is therefore an object of the invention to provide more accurate control of a filling process.

This object is satisfied by a method for controlling a filling process, wherein a predetermined filling quantity of a medium is filled into a container, the flow rate of the medium flowing into the container is measured as a time series of measured values for the instantaneous flow rate and a filling quantity already filled is estimated from the time series, wherein at least one current measured value of the time series is corrected on the basis of at least one earlier measured value of an earlier time series of measured values of the flow rate of an earlier filling process.

The object is also satisfied by a filling device for filling a container with a medium under the control of a valve, comprising a flow sensor and a control and evaluation unit that is configured to measure the flow rate of the medium flowing into the container as a time series of measured values for the instantaneous flow rate, to estimate a filling quantity already filled from the time series after correcting at least one current measured value of the time series on the basis of at least one earlier measured value of an earlier time series of measured values of the flow rate of an earlier filling process, and to close the valve as soon as the filling quantity which has already been filled has reached a predefined filling quantity.

The filling quantity is predetermined, for example, as the volume of the medium, in particular a liquid, that is to be filled into the container. Preferably, a plurality of filling processes into a corresponding plurality of containers is performed in parallel. The flow rate of the medium is measured, for example in a supply line to the container. Measurement data is generated in the form of successive measurements of the instantaneous flow rate, i.e. a discretization of the flow rate as a time series of measured values, which may be referred to as a filling curve or filling characteristic. The filling quantity already filled can be determined from that measurement data, it is the integral of the flow rate since the beginning of the filling process and accordingly, in the discretized form, the sum of the time series taking into account the measurement period of the individual measured values of the time series. The filling process can be terminated as soon as the filling quantity already filled reaches the predetermined filling quantity. Preferably, an overrun quantity of medium is taken into account that will still flow into the container after the filling process has ended.

The invention starts from the basic idea of compensating for measurement errors of the measured values for the instantaneous flow rate due to tolerances, noise from various sources, such as electronic noise or fluctuations in measured values due to fluid mechanical effects and the like, from the history of at least one earlier measurement. At least one earlier measurement value is used to correct at least one current measurement value. An earlier measurement value as part of the history is a measurement value for the flow rate from a time series of an earlier or preceding filling process that has already been completed, and accordingly a current measurement value is a measurement value from the time series of measurement values for the instantaneous flow rate of the current filling process. The correction is based on the assumption that the filling process is a largely reproducible process at least over a certain period of successive filling processes. Inaccuracies are mainly caused by measurement noise of the individual measured values within a time series.

The current time series is improved from the history and then exhibits a significantly reduced measurement noise. Thanks to this improvement, it is possible to estimate a more accurate value of the filling quantity already filled.

The invention has the advantage that a particularly precise measurement of the filling quantity is made possible. The filling profile, i.e. the course of the flow rate during the filling process, can be virtually arbitrary and, in contrast to some approaches of the prior art, it is also not necessary to know it in advance. Thus, the method according to the invention is much more flexible and can be used without specific manual adjustment to the filling process. The same applies to influences of a controllable filling valve on the filling profile, because the invention is independent of a specific cause for a variation of the filling profile. Almost any noise behavior of the flow rate in noise spectrum and noise level is compensated, so that a knowledge of the specific noise that occurs is not necessary. The noise should preferably have zero mean, but this is usually given in a flow measurement and could otherwise be compensated by calibration. In practice, there are often cramped installation conditions where the usual inlet and outlet distances of a sensor measuring the flow cannot be maintained. Then, the flow profile, which is not calmed or not sufficiently calmed, generates increased measurement noise. The invention with its compensation of the measurement noise thus also facilitates the planning and implementation of a filling system.

Preferably, a weighting is determined for the contribution of the respective current measurement value and the at least one earlier measurement value used for its correction. For example, the current measurement and the history may be weighted equally with respect to each other, with the caveat that a plurality of earlier measurements may contribute to the history and thus the contribution of a single earlier measurement becomes smaller than that of the current measurement. The weighting may alternatively be shifted more towards the current measurement or more towards the history. Furthermore, weighting is also conceivable within the earlier measurements of the history. Throughout this specification, the terms preferably or preferred refer to advantageous, but completely optional features.

The filling process preferably is started by opening at least one valve and is ended by closing the valve. Thus, the filling process is valve-controlled, and the valve is acted upon by the method for controlling the filling process according to the invention. In particular, the valve is closed as soon as the required quantity has flowed through, i.e. as soon as the measured filling quantity already filled, preferably plus an expected overrun quantity until the valve actually completely closes after the control for closing, reaches the predetermined filling quantity.

A start of a filling process preferably is detected by the measured instantaneous flow rate exceeding an initial threshold value. In order to be able to correctly relate the time series of earlier measurements and the time series of the current measurement to one another, they should start at a comparable time with their first measured value, or in any case there should be a common reference time in order to be able align the measured values in time. The steeply rising slope of the flow rate at the beginning of a filling process is a preferred reference, as it can be very reliably localized in time on the basis of an initial threshold value.

The correction of the current measured value preferably is carried out on the basis of an earlier measured value at an identical point in time within the respective time series, in particular with respect to a start of the filling process. Thus, a current measured value is corrected with earlier measured values at a same point in time within the respective filling process of the measured values. The respective start of the filling process is preferably used as a reference point for a same point in time. In the case of a perfectly reproducible filling process and ideal error-free flow measurement, all current measured values would be equal to respective earlier measured values. For a correction of the measurement noise, good results can therefore be expected from measured values at a same point in time within the time series, even in the case of a filling process that is only well or somewhat and not perfectly reproducible. Preferably, only measured values at a same point in time within the respective time series are used exclusively. It is also possible to take into account temporally adjacent measured values within the respective time series, but in that case preferably with less weight.

Preferably, a plurality of current measured values of the time series are corrected, in particular all current measured values since the beginning of the filling process. The correction of only a current measured value from a history with at least one measured value already leads to a certain increase in the measurement accuracy for the filling quantity already filled. If many or all current measured values of the time series are corrected, the measurement accuracy is further improved. If some current measured values are not corrected due to lack of computing resources, computing time or other reasons, this can still be understood as a correction of all current measured values now within the scope of what is possible or desired.

The correction preferably is performed on the basis of a predetermined plurality of time series of earlier measured values of the flow rate of a plurality of filling processes. Accordingly, in this embodiment, the history comprises a plurality of earlier filling processes and not just one. Preferably, these are directly preceding filling processes, such as the last two, five, ten, fifty or the like. However, this does not have to be the case, for example, it may be useful to include at least some older or much older filling processes.

The correction preferably is determined from a statistical measure of earlier measured values, in particular a mean value or a median. The statistical measure can be used to correct the current measured value, or the current measured value is included in the statistical measure which then provides the corrected current measured value. Some specific examples are averaging or moving average. Preferably, there is a decreasing weighting, for example decreasing with the age of the earlier filling process. Alternatively, a weighting only distinguishes between current and earlier measurement, in which case all filling processes within the history contribute with equal mutual weight.

At least one earlier measured value preferably is used as an input value of a filter, and the filter estimates a corrected current measured value on the basis of earlier measured values and the current measured value. In this embodiment, the earlier measured values are used as input values of the filter, which in turn corrects the current measured value. The filter is preferably applied continuously to the respective current measured value, which then becomes an earlier measured value for the subsequent filling processes. In particular, the filter is an FIR filter (Finite Impulse Response) or an IIR filter (Infinite Impulse Response).

Filter parameters and/or intermediate variables preferably are stored instead of earlier measured values. Storing a history with a plurality of complete time series of earlier measured values requires a lot of memory. This can become particularly problematic if the method according to the invention is to be implemented in the sensor for flow measurement with very limited hardware resources. In this preferred embodiment, only filter parameters or intermediate values of earlier filterings are stored, and the earlier measured values themselves can be discarded and do not need to be stored. In the case of a low-order filter, in particular a first-order filter, only a few values need to be stored, and yet a longer history can also be taken into account.

The time series and at least one earlier time series preferably are arranged into a 2D array and processed with a 2D filter kernel to correct the current measurement value. For this purpose, the time series may be arranged on top of each other as rows of a 2D field, aligned for example at a beginning of the respective filling process. This is only an illustration, the actual representation in rows, columns or any other form does not ultimately matter. According to the previous embodiments, the correction may be understood as being performed column-wise and one-dimensionally from earlier measured values that are positioned at same points in time within their time series as the current measured value to be corrected. Now, in this preferred embodiment, the 2D field is commonly processed with a filter kernel, analogous to image processing. In this way, depending on the design of the filter core, temporally adjacent earlier and/or current measured values also influence the correction in a desired manner.

The current measured value and the corrected current measured value preferably are compared with each other and, in the event of a discrepancy exceeding a tolerance threshold, a weighting between the current measured value and at least one earlier measured value is changed. A certain correction within the limits of the measurement noise is the purpose of the invention. However, if the deviation becomes very large, evaluated for example by a deviation of several standard deviations of the history at that point in time within the filling process, it is presumably no longer merely measurement noise or expected drifts to which the process adjusts. Rather, this indicates a true outlier. The method according to the invention can respond to this by reweighting the history against the current measurement. If there is a discrepancy lasting over a plurality of filling processes and/or measurement values, the filling process may have been changed, or there may be a fundamental error, and the method according to the invention may indicate this with a warning.

Current measured values in an initial phase and/or a final phase of the filling process are compared with earlier measured values in an initial phase and/or final phase of the filling process in order to check the valve or to determine an overrun quantity. In a preferred embodiment described above, the time series do not begin until the flow rate exceeds an initial threshold. However, the measured values from this phase may provide information about the condition of the valve. The same applies to the phase in which the valve is closed. As a result of the monitoring, an overrun quantity can be recalculated or a maintenance request for the valve can be issued.

The filling device for filling a container with a medium under the control of a valve according to the invention comprises a flow sensor and a control and evaluation unit that is configured to close the valve as soon as a predetermined filling quantity is reached, and to determine a time for closing the valve on the basis of a filling quantity already been filled that is determined by the method according to the invention.

Figure 2:
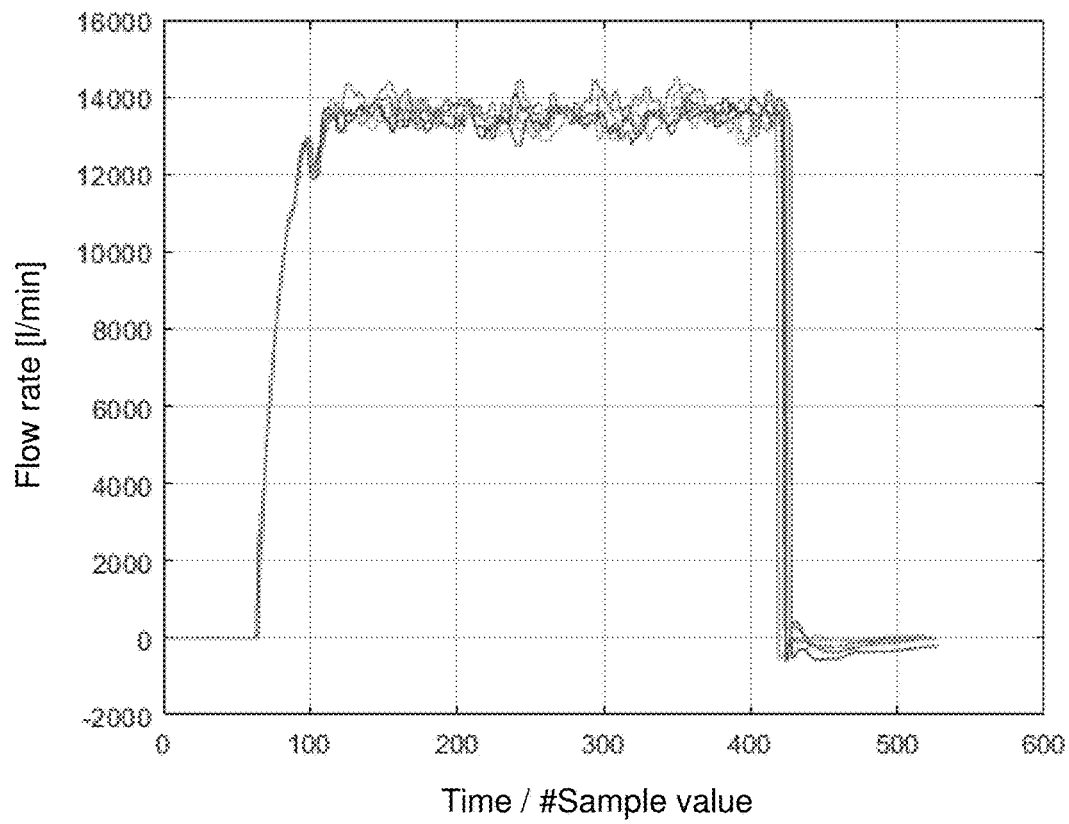
Figure 3:
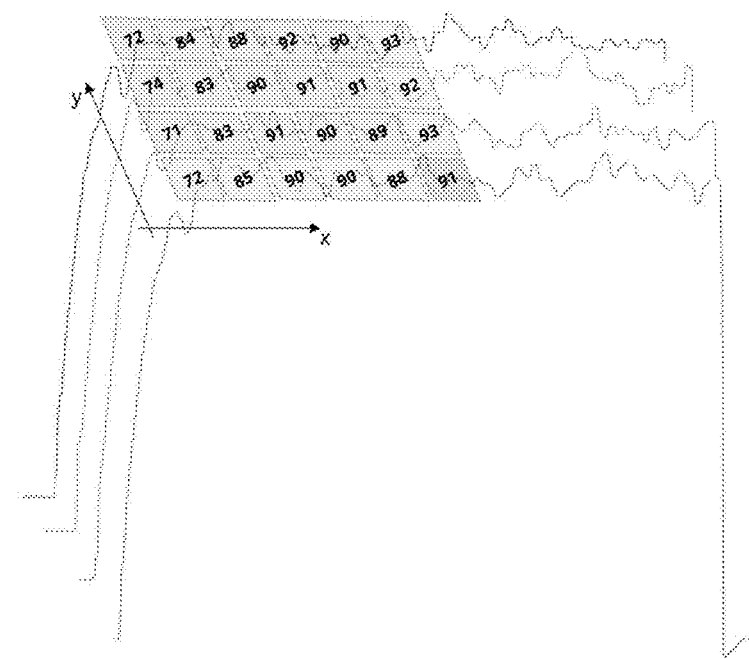
Figure 4:
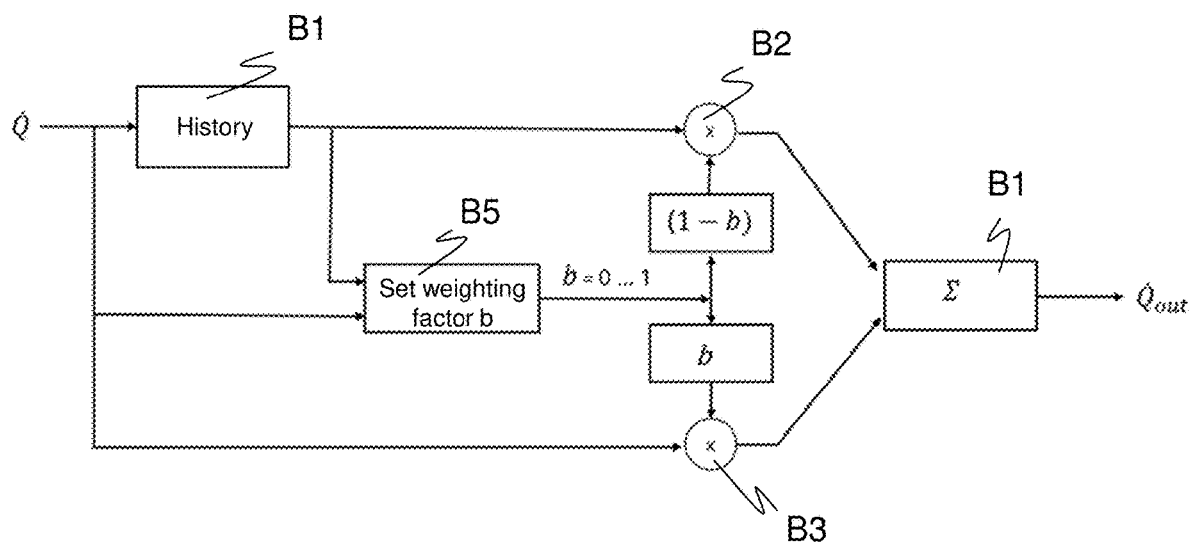

The invention will be explained in the following also with respect to further advantages and features with reference to exemplary embodiments and the enclosed drawing. The Figures of the drawing show in:

FIG. 1 a schematic overview of a filling device;

FIG. 2 a plurality of time series of measured values of the flow rate of a plurality of filling processes shown one above the other;

FIG. 3 a plurality of several time series similar to FIG. 2 with an additional artificial offset in the Y-direction to illustrate an arrangement as a 2D-field; and FIG. 4 a simplified flow chart for correcting measured values from a history.

FIG. 1 shows a schematic overview of a filling device 10. From a storage container 12, medium 14 flows via a supply line 16 into a container 18. The medium 14 is a liquid, for example a beverage, but can also be viscous and generally any medium capable of flowing. The container 18 shown is a bottle, which is also merely representative of any container holding the medium 14. In practice, usually not only a single container 18 is filled, but a plurality of containers are filled in parallel, so that the arrangement shown is multiplied in a plurality of filling lines at the one storage container 12 or at a plurality of storage containers.

The aim of a filling process is to fill a precisely predetermined quantity of the medium 14 into the container 18. The quantity can be predetermined as a volume, for example exactly 1 l, likewise as a mass, which is proportional to the volume via the density if the medium 14 is known, or any other suitable quantity. The filling process is started by opening a valve 20 and ended by closing it. In order to find the correct time to close the valve 20, the quantity 22 of the medium 14 already filled in the container 18 is determined. This measurement is carried out indirectly by a flow sensor 24 measuring the flow rate in the supply conduit 16, that is, a quantity or mass flowing through the cross-section of the supply conduit 16 per time unit. The filling process is controlled from a control and evaluation unit 26, which is connected to the valve 20 and the flow sensor 24. The control and evaluation unit 26 is shown as a separate block, it can also be at least partially integrated into the flow sensor 24, or be responsible for a plurality of parallel filling lines.

The flow sensor 24 can implement any measuring principle, in particular be one of the Coriolis sensors, magnetic-inductive flow sensors for a medium 14 having a minimum conductivity, ultrasonic flow sensors or vortex sensors already mentioned in the introduction. The method according to the invention, which will be presented shortly with reference to FIGS. 2 to 4, increases the effective measurement accuracy of the filled quantity 22, for example in terms of volume or weight, irrespective of the physical principle used for the original measurement. However, it is particularly advantageous for vortex sensors which, due to their principle, have a very high variance, but are otherwise very suitable for a filling device 10 due to their low-cost realization. The previously existing disadvantage of limited measurement accuracy is at least partially eliminated by the method according to the invention.

It is not the flow rate, but the quantity 22 already filled that is actually the desired measurement information, that is, the integral of the flow rate over the period of the filling process. Some preferred flow sensors 24 already determine the flow rate by multiplying the flow rate by the period of the measurement rate, and output a respective plurality of pulses, each pulse corresponding to a given quantity, such as 1 ml or 1 g. The predetermined quantity can be converted into a number of such pulses, so that by counting the pulses from the flow measurement sensor 24 and comparing them to the number of pulses for the predetermined quantity, the time to close the valve 20 can be determined very easily. Other flow measurement sensors 24 have a frequency output, i.e. a binary output where the repetition frequency of the pulses corresponds to the current flow rate. Of course, it is also conceivable to output flow rate or the product of flow rate and measurement period in another form, such as a numerical value. It should be noted that, when the valve 20 is actuated, the flow of the medium 14 is not immediately stopped. The medium 14 still flowing in this phase during closing of the valve 20 can be estimated or be determined from earlier measurements as an overrun quantity, and the time for closing can be set earlier accordingly.

FIG. 2 shows exemplary curves of the flow rate measured by the flow sensor 24 for a plurality of filling processes, plotted one above the other. The flow sensor 24 generates measured values with a certain measuring repetition rate and thus a time series of n sampled values. The respective identity #i, i=1 . . . n of the sample value is plotted on the X-axis, and the associated measured value or instantaneous flow rate is plotted on the Y-axis. The time series or courses are aligned on the X-axis at the beginning of the filling process or at that point in time at which the valve 20 is opened. This beginning can be located with a threshold on the rising leading edge.

It can be seen that the filling processes, and hence the time series of measured flow rates, exhibit a high degree of reproducibility over at least some filling processes. The prerequisite is, of course, that the filling process itself is not changed, which can be defined, for example, as a certain medium 14 being filled in a certain filling device 10 with a certain valve 20 at a given temperature and at an at least approximately constant filling level and thus pressure in the storage container 12.

However, even given reproducibility, the time series are by no means identical to each other, but show a variance which is essentially caused by measurement noise. Since the filling process itself is assumed not to be changed, this variance is regarded as a measurement error and corrected according to the invention. The basis for the correction of a currently measured time series is the history of at least one earlier measured time series. From this history it is derived which flow rate is to be expected in view of the reproducibility, and this prior knowledge influences the current measurement via its correction.

It is conceivable to correct only individual measured values, for example at the sample value #121, or only a partial range or a plurality of partial ranges of the time series. However, the most accurate result is achieved if numerous measured values and, preferably, the entire time series is corrected from opening of the valve 20 until the predetermined quantity is reached with closing of the valve 20, and this preferred case is assumed in the following for simplification.

In one embodiment, at least one time series of the measured values for the flow rate is stored during a filling process. The extent of the history stored in this way depends on the one hand on the available storage and computing capacities, and on the other hand the history should only cover a period with sufficient reproducibility. With these considerations, the last k time series can be stored, k=1 . . . 100 or more, wherein gaps are also conceivable in particular with increasing age of the earlier time series.

The current measured values for the flow rate are then corrected from this history. The correction of the current measured value #i at a certain point in time within the time series is preferably based on the earlier measured values #i at a same time relative to the respective time series. Preferably, a statistical measure is calculated, such as a mean value or a median. In this statistical measure, current measurement and earlier measurements can have different weights, wherein the earlier measurements among one another can also have equal or differing weights, for example a decreasing weight with increasing age.

In particular in case of a very high time resolution of the flow sensor 24 and thus many measured values per time series and/or a long history with many earlier filling processes taken into account, a high memory requirement and computing effort arises. It is therefore advantageous not to store the history completely, but to continuously include it in parameters of a correction. A simple implementation of this type is a moving average that summarizes the history per measured value #i in a single value.

A more complex and adaptable implementation option uses a filter, in particular an IIR filter (Infinite Impulse Response) or an FIR filter (Finite Impulse Response), which is parameterized from the respective history for each time point within the time series or sample value #i. With a suitable nth-order filter, such as an IIR filter, only n parameters need to be stored for each measured value, regardless of the scope of the history, in particular only one parameter in case of a first-order filter. In the case of an IIR filter, more values must be stored depending on the history, but it may still be possible to store the history in a compressed form as a result. The filter parameterizes itself gradually on the basis of the respective current time series, which then form the history for later filling processes. The parameterization of the filter remains continuously adapted by the respective current time series.

Depending on the specific filling process, different advantageous weightings can be set for current and historical measured values of the time series. A higher weighting of the history brings an improvement in the accuracy of the filling, since the measurement noise of the respective measured value is better corrected. However, at the same time the requirements for the reproducibility of the filling process increase. An analysis of the impulse response of an IIR filter of the first order with an equal weighting of the current time series and the history of the earlier time series shows that after seven filling processes there is practically no longer any influence. For the duration of seven filling processes, good reproducibility can be assumed. With a shifted weighting or a more complex filter, in particular of higher order, the history can also have a longer influence.

FIG. 3 is an illustration explaining an alternative filtering of the history and current measurement of the flow rate. Similar to FIG. 2, a plurality of time series of measured values of the flow rate for a plurality of filling processes are shown. The courses are offset from each other in the additional y-direction. Thus, a two-dimensional discrete function or 2D field of measured values is formed. Time is still plotted on the X-axis, and the additional Y-axis discretely encodes the identity of the respective filling process. The respective measured value is stored in this 2D field defined by X and Y and is plotted on the vertical Z-axis in FIG. 3.

This two-dimensional structure of the measurement data corresponds to an image resolved in pixels. In the embodiments explained so far with reference to FIG. 2, the correction or filtering takes place only column-wise and one-dimensionally for the same X-position at the sample value #i within its respective time series. In an advantageous embodiment, however, statistical measures can also be determined in two directions, or 2D filter kernels can be applied similar to those used in image processing. Thus, the correction is no longer carried out point by point from the immediate past of exactly this measured value, but, depending on the 2D filter kernel, also from temporally adjacent measured values and/or their history.

For example, statistical methods can be used to determine a mean value and a standard deviation in the X-direction and in the Y-direction and thus decide in which time series a current measurement value fits best. This information can be used, for example, to adjust a weighting of the history or of a certain part of the history with respect to the current measurement. In general, it is possible to choose between filtering in the y-direction and filtering in the x-direction, or to combine both, in particular on the basis of a statistical assignment of the current measured value. This allows even more accurate corrections and an improved reaction to changes in the filling process.

FIG. 4 shows a simplified, exemplary flow chart for the correction of measured values of the flow rate from a history as well as for the adjustment of the weighting between current measurement and earlier measurements. The respective current measured value $\dot{Q}$ for the flow rate is the input value, the corrected measured value $\dot{Q}_{out}$ is the output value. In a block B1 the history is taken into account and modified by the current measurement, for example statistical measures are calculated or filter parameters are adjusted. This has been explained above in various embodiments. Via a block B2 the history and via a block B3 the current measured value $\dot{Q}$ is weighted with b or its complement 1-b. Both are combined in a block B4 to the output value $\dot{Q}_{out}$.

There are various states that require a change in the weighting in a block B5. Initially, at switch-on, there is not history, and preferably only the current measured value with b=1 is used at the beginning. As a history is built up, it gains increasing weighting up to the intended weighting b at the end of the transient initial phase.

In steady-state operation, measurement noise, drifts due to expected process changes and unusual events are to be distinguished. As long as the deviation remains in the expected noise band, correction is made according to the invention and the weighting is retained. An unusually large deviation between the current measurement and the history, for example measured by a multiple of the standard deviation of the history, can be accounted for by giving higher weighting to the current measurement. This applies, for example, to changes in temperature or pressure in the container 12 due to previous outflow of medium 14. Process changes and unusual events can also be estimated using a Kalman filter, which assesses the state of the current measured value using a known noise distribution.

However, if deviations occur which can no longer be explained physically due to the fluid dynamics, i.e. if a change is greater than a threshold for $|\dot{Q}|$, then it is probably a matter of interference, such as bubbles in the system, vibrations or other. In this case, the history can be heavily weighted and the obviously faulty current measured value be excluded from the history. A warning can also be issued, in particular if discrepancies between history and current measurement do not resolve.

It is conceivable that the weighting factor may also depend on measurements from additional sensors. A change in, for example, pressure or temperature may also be detected by other sensors of the filling device 10 including other flow sensors. In the event of a coincidence of such changes reported by additional sensors and a discrepancy between the history and the current measurement, the current measurement may be relied upon more heavily since the history was obviously obtained under different conditions.

Networking between the flow sensor 24 and further sensors may be accomplished by sensor-to-sensor communication or may be mediated at a higher level, whether by connecting the further sensor to the control and evaluation unit 26 or a network possibly including a cloud. Latencies play a subordinate role, because the required response times tend to be only in the range of seconds.

Some aspects of the method according to the invention have only been touched upon or not even addressed in the previous specification, and these will now be dealt with in more detail in conclusion.

In order to be able to correct a current measured value from its history, the time series should be aligned with each other in terms of time, as is also shown in FIG. 2. For this purpose, a suitable reference time may be selected, in particular as the trigger time for the acquisition and storage of measured values, so that the time series are acquired with the correct time reference, without having to align them with each other afterwards. A suitable trigger time is given by the rising edge in FIG. 2 at the beginning of the filling process.

An initial threshold can be defined for this purpose. On the one hand, this should be selected high enough so that no false triggering occurs at zero flow before the filling process. On the other hand, the initial threshold value should also be small enough so that an early range of the edge is detected, that is steep and is not confused with measurement noise, but dominated by the filling process itself. In FIG. 2, this would be an initial threshold around 1000, which is well outside any noise band prior to the time the valve 20 opens and not yet in the potentially more noisy slower rising part of the slope.

In principle, instead of the start of the filling process, the falling edge at the end of the filling process can also be aligned in a similar way. However, this can only be done retrospectively based on the stored time series, since of course the end of the filling process, unlike the beginning of the filling process, cannot be used as a trigger for recording measured values.

As a further aspect, it should be considered that the filling process and the acquisition of the flow rate are temporally non-contiguous processes, i.e. asynchronous processes. In order to achieve a good result, the time resolution of the flow rate measurement should have a minimum value, since otherwise the correction of the current measured values from the history may introduce additional errors, in particular in the case of a high change in the flow rate when opening and closing the valve 20. Alternatively, the method can be used in time periods with constant flow rate, where the temporal relationship is less critical.

An initial phase of the process according to the invention has already been briefly mentioned in connection with FIG. 4. No history is yet available for a first filling process. Here, the weighting is initially such that only the current measured values have an influence. The history is then built up from the first filling process or the first filling processes and, in particular, the filter chain is pre-assigned so that a correction is already possible from the second filling process onwards, which is further improved until sufficient filling processes have been completed to fill up the intended history.

It is conceivable to store the history of a filling process that has been recorded in a persistent memory, so that, for example, after a brief interruption in the voltage, the process can be continued with the same quality. This storage can also be carried out together with basic conditions such as the quantity to be filled, the type of medium 14, the temperature and the pressure as a kind of recipe. If filling is then to be carried out later under the same general conditions, the initial phase for presetting the filters when a history is first set up can be omitted and the stored history can be loaded instead.

In order to compensate for the uncertainty in an initial phase and to guarantee the filling of the legally prescribed minimum quantity in any case, the quantity 22 already filled can initially be intentionally underestimated by a tolerance as a precaution. With knowledge gained from the growing history, for example a standard deviation for the quantity 22 already filled, this underestimation can then be gradually withdrawn.

A history only leads to meaningful corrections as long as there is no decisive change in the filling situation. This can generally be countered by changing the weighting, as discussed above for FIG. 4. A special problem arises, however, if the flow rate decreases and the filling process is thus prolonged. Then, towards the end of the time series, the falling edge at the end of the earlier filling process of the history and the still high flow rate of the current measurement overlap. This does not result in any meaningful mixing, and the current measurement should be weighted more heavily or used exclusively and a new history built up. Similar problems arise as the flow rate increases and the filling process shortens.

In another aspect, the time series can be used to monitor the valve 20. The opening and closing behavior can change due to mechanical wear and the like, and this is reflected in changes in the measured values in the time series at the beginning and end of the filling process. From this, diagnostic information can be provided for the plant control system.

Depending on the time resolution of the flow sensor 24, very few measured values or even only a single measured value may be recorded in the edges when the valve 20 opens and closes quickly. However, since the filling process and the flow measurement are asynchronous to each other, different positions of the edge are sampled from filling process to filling process with the history. Thus, thanks to the history, the opening and closing behavior can still be examined and, for example, an overrun quantity can be determined.

In a measurement setup, the quantity 22 already filled as determined by the method according to the invention was compared with the actual quantity 22 already filled as determined via a scale. The measured values were respectively corrected by a first order filter and a weighting between actual measurement and history of 50/50 and 30/70 was used in two evaluations. The standard deviation of the relative error improves with weighting 50/50 from 0.66% to 0.45%, i.e. reduction by a factor of 0.68, and with 30/70 weighting even to 0.40%, and this corresponds to a reduction by a factor of 0.6.

The invention claimed is:

1. A method for controlling a filling process, comprising:
  filling a predetermined filling quantity of a medium into a container, wherein a flow rate of the medium flowing into the container is measured as a time series of measured values for an instantaneous flow rate;
  estimating a filling quantity already filled from the time series; and
  correcting at least one current measured value of the time series based on at least one earlier measured value of an earlier time series of measured values of the flow rate of an earlier filling process.

2. The method according to claim 1, wherein the filling process is started by opening at least one valve and is ended by closing the at least one valve.

3. The method according to claim 1, wherein a start of a filling process is detected by the measured instantaneous flow rate exceeding an initial threshold value.

4. The method according to claim 1, wherein the correction of the current measured value is based on an earlier measured value at an identical point in time within the respective time series.

5. The method according to claim 4, wherein the identical point in time is defined with respect to a start of the filling process.

6. The method according to claim 1, wherein a plurality of current measured values of the time series are corrected.

7. The method according to claim 6, wherein all current measured values since the beginning of the filling process are corrected.

8. The method according to claim 1, wherein the correction is performed based on a predetermined plurality of time series of earlier measured values of the flow rate of a plurality of filling processes.

9. The method according to claim 1, wherein the correction is determined from a statistical measure of earlier measured values.

10. The method according to claim 9, wherein the statistical measure is a mean value or a median.

11. The method according to claim 1, wherein at least one earlier measured value is used as an input value of a filter, and wherein the filter estimates a corrected current measured value based on earlier measured values and the current measured value.

12. The method according to claim 11, wherein the filter is an FIR filter or an IIR filter.

13. The method according to claim 11, wherein at least one of filter parameters and intermediate variables is stored instead of earlier measured values.

14. The method according to claim 1, wherein the time series and at least one earlier time series are arranged into a 2D array and processed with a 2D filter kernel to correct the current measurement value.

15. The method according to claim 1, wherein the current measured value and the corrected current measured value are compared with each other and, in the event of a discrepancy exceeding a tolerance threshold, a weighting between the current measured value and at least one earlier measured value is changed.

16. The method according to claim 1, wherein the current measured values in at least one of an initial phase and a final phase of the filling process are compared with earlier measured values in the initial phase or the final phase of the filling process in order to check a valve or to determine an overrun quantity.

17. A filling device for filling a container with a medium under the control of a valve, comprising:
  a flow sensor; and
  a control and evaluation unit configured to:
  measure a flow rate of the medium flowing into the container as a time series of measured values for an instantaneous flow rate;
  estimate a filling quantity already filled from the time series after correcting at least one current measured value of the time series based on at least one earlier measured value of an earlier time series of measured values of the flow rate of an earlier filling process; and
  closing a valve as soon as the filling quantity which has already been filled has reached a predefined filling quantity.

* * * * *